United States Patent [19]

Wijnen

[11] Patent Number: 5,481,608
[45] Date of Patent: Jan. 2, 1996

[54] METHOD AND AN APPARATUS FOR PREVENTING UNAUTHORIZED COPYING OF VIDEO SIGNALS ON TAPE

[75] Inventor: Arie M. Wijnen, Holargos, Greece

[73] Assignee: Copyguard Enterprises, Luxembourg

[21] Appl. No.: 191,358

[22] Filed: Feb. 3, 1994

Related U.S. Application Data

[63] Continuation of Ser. No. 752,683, filed as PCT/EP91/00738, Apr. 18, 1991, abandoned.

[30] Foreign Application Priority Data

Apr. 20, 1990 [NL] Netherlands ............................ 9000951

[51] Int. Cl.$^6$ .......................... H04N 5/913; H04N 5/92; H04N 7/167
[52] U.S. Cl. ................... 380/5; 380/10; 380/15; 360/37.1; 360/60
[58] Field of Search .............................. 380/3, 5, 7, 10, 380/15; 358/335; 360/37.1, 60

[56] References Cited

U.S. PATENT DOCUMENTS

| | | | |
|---|---|---|---|
| 4,100,575 | 7/1978 | Morio et al. | 380/5 |
| 4,163,253 | 7/1979 | Morio et al. | 380/5 |
| 4,213,149 | 7/1980 | Janko | 380/5 |
| 4,295,155 | 10/1981 | Jarger et al. | 380/15 X |
| 4,390,898 | 6/1983 | Bond et al. | 380/15 X |
| 4,571,642 | 2/1986 | Hofstein | 380/5 |
| 4,695,901 | 9/1987 | Ryan | 380/5 |
| 4,819,098 | 4/1989 | Ryan | 360/37.1 |
| 4,888,649 | 12/1989 | Kagota | 358/335 |
| 4,907,093 | 3/1990 | Ryan | 358/335 |
| 5,130,810 | 7/1992 | Ryan | 358/335 X |
| 5,179,452 | 1/1993 | Takahashi | 358/335 |
| 5,262,874 | 11/1993 | Ryan | 358/335 |

FOREIGN PATENT DOCUMENTS

| | | | |
|---|---|---|---|
| 0189548 | 8/1986 | European Pat. Off. | H04N 5/91 |
| 0199553 | 10/1986 | European Pat. Off. | H04N 5/91 |
| 0364047 | 4/1990 | European Pat. Off. | H04N 5/91 |
| 1571386 | 7/1980 | United Kingdom | G11B 5/02 |
| 2055501 | 3/1981 | United Kingdom | G11B 5/02 |
| 2086641 | 5/1982 | United Kingdom | G11B 23/28 |
| 8605057 | 8/1986 | WIPO | H04N 5/91 |

OTHER PUBLICATIONS

JP Patent Abstracts of Japan, vol. 9, No. 35 (E-296)(1758), 14 Feb. 1985 #59178892 (Yuuzou Uehagi) 11 Oct. 1984.

Primary Examiner—Bernarr E. Gregory
Attorney, Agent, or Firm—Larson and Taylor

[57] ABSTRACT

A method and an apparatus for modifying video signals in such a manner that, when recording said signals with a tape recording apparatus, the control of this apparatus is disturbed, which signals comprise image point signals grouped according to image lines and preceded, in each line, by a line synchronization pulse and a colour synchronization signal, the plurality of lines being combined to a frame preceded by a frame synchronization pulse, the image point signals being situated at one side, and the synchronization pulses at the other side of a zero level, in which additional pulses resembling line synchronization pulses having a deviating shape or situated in deviating points of a frame are added. In particular, in at least a part of the frames, in a number of last lines the normal line synchronization pulses are removed in arbitrary locations, and, instead thereof, additional pulses with a deviating shape, and in particular a shorter duration, are introduced.

17 Claims, 2 Drawing Sheets

METHOD AND AN APPARATUS FOR PREVENTING UNAUTHORIZED COPYING OF VIDEO SIGNALS ON TAPE

This application is a continuation of application Ser. No. 07/752,683 filed on as PCT/EP91/00738, Apr. 18, 1991, now abandoned.

In order to counteract unauthorized recording of video programs legitimately recorded on tape or transmitted via television channels, it has already been proposed to modify the video signal series in such a manner that this is not perceptible in a reproducing apparatus, but that the control of an apparatus used for illegally recording these signals is sufficiently disturbed so as to make the recording unusable.

There is still a need for such an improvement of such methods that such disturbances cannot be removed by means of so-called time-base correctors.

The invention relates to a method for this purpose, according to which the video signals are of the kind which comprise image point signals grouped according to image lines and preceded, in each line, by a line synchronization pulse and a color synchronization signal and wherein the lines are combined to form a frame and preceded by a frame synchronization pulse, signals, according to the invention, additional pulses resembling line synchronization pulses with a deviating shape or in deviating points of a frame are added.

The additional pulses have the consequence that, in a recording apparatus, the amplification thereof is influenced in such a manner that the zero level in the subsequent part shifts towards the side of the synchronization pulses. In accordance with further features the recognizability of the subsequent frame synchronization pulses is reduced or removed, whereas, in the case of yet additional features, the subsequent image point signals will be suppressed or attenuated. In both cases the quality of the recorded image will be disturbed in such a manner that such a recording will become unsaleable. Since, in both cases, the location of the additional pulses in the frame can be continually varied, it becomes virtually impossible to remove said disturbance.

The control circuits of a reproducing apparatus will not be influenced by these additional pulses, so that a tape with only modified signals remains as such suitable for normal reproduction.

BRIEF DESCRIPTION OF THE DRAWINGS

The invention will be elucidated below in more detail by reference to a drawing, showing in.

DETAILED DESCRIPTION OF THE INVENTION

Figure 1:
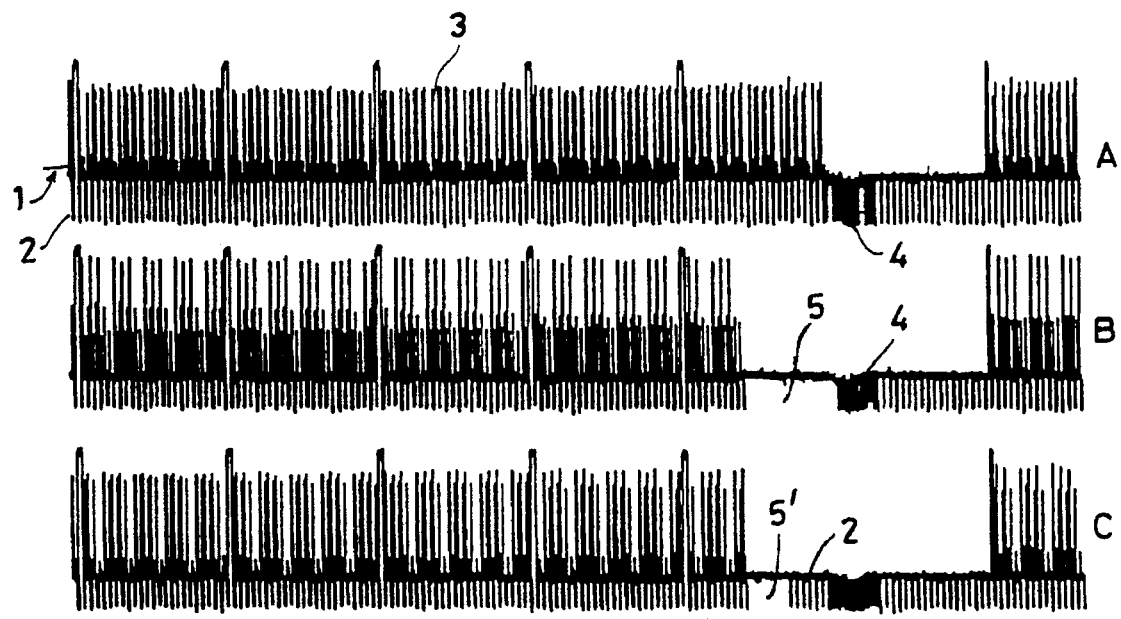
FIG. 1 shows video signal oscillograms for elucidating a first embodiment of the invention.
Figure 1:
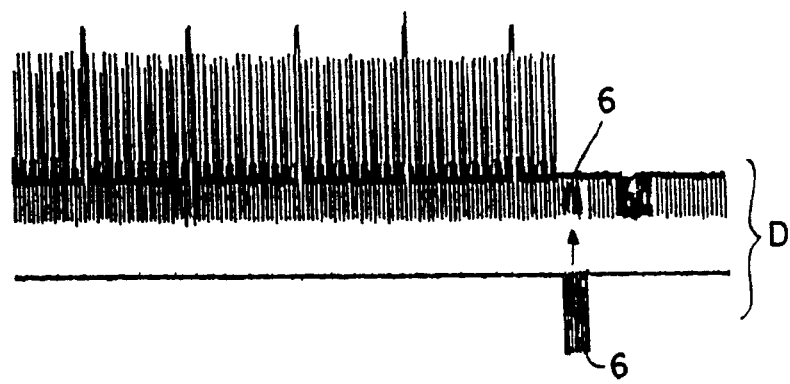
Figure 1:

In Part A of FIG. 1 the end of an image frame of a normal television image signal is shown. This comprises line synchronization pulses 2 situated below a zero line 1, image line signals 3 above this zero line, and a frame synchronization pulse signal 4 at the beginning of the next frame and also situated below the line 1.

According to the invention, and as indicated at 5 in Part B of FIG. 1, initially a number of image lines 3, e.g. 10 to 20 lines, with the corresponding line synchronization pulses 2, is removed. These lines lie, at any rate, already outside the normal image frame, and can be done without therefore as such.

Subsequently, e.g. in the manner of Part C of FIG. 1, in the interspace 5 thus obtained the original line synchronization pulses 2 are provided in specific points, and an interspace 5' will then remain.

In Part D of FIG. 1 is shown that the interspace 5' of Part C of FIG. 1 is filled with additional pulses 6, and Part E of FIG. 1 shows, at a different time scale, that these pulses have a deviating or different shape, i.e. are shorter than the normal pulses 2.

Figure 2:
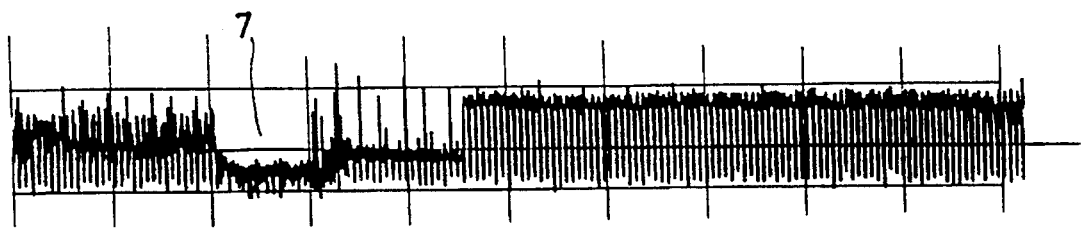
FIG. 2 a corresponding oscillogram, from which appears the disturbance occurring when unauthorizedly recording on tape video signals modified according to the invention.

These deviating or different shaped pulses 6 have the consequence, that, when recording the signals in a tape recording apparatus, the control is disturbed. The oscillogram reproduced in FIG. 2 shows at 7 that, as a consequence of the deviating pulses, the zero level 1 is shifted towards the negative side, i.e., in a negative sense, so that the synchronization circuit of the recording apparatus will not recognize or badly recognize them as synchronization pulses, so that the frame synchronization is disturbed. The image quality becomes so bad that such tape recordings will be unsaleable.

This disturbing effect can be amplified by changing the location of the additional pulses 6, and then also more than one interspace 5' can be formed. This need not to take place in each frame. In this manner a completely random disturbance can be obtained, so that the effect will be amplified still more, and suppression of the disturbance will be made virtually impossible.

Figure 3:
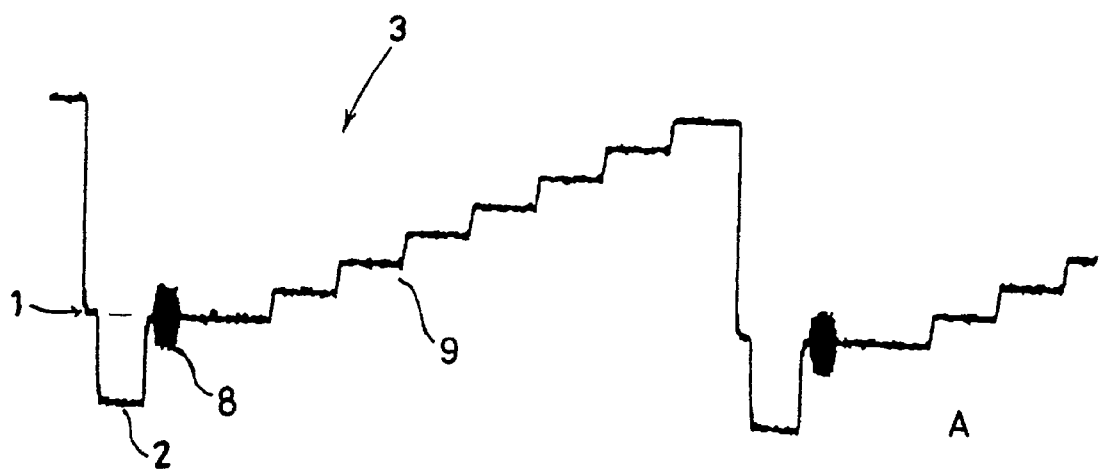
FIG. 3 shows oscillograms of an image line for elucidating a second embodiment of the invention.
Figure 3:
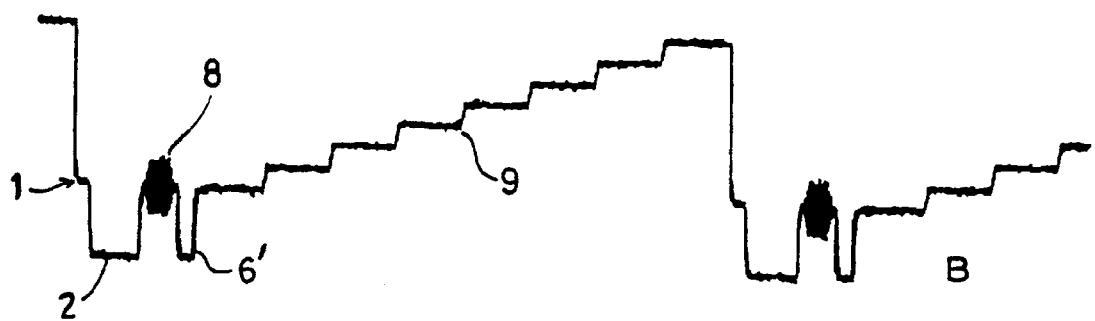
Figure 3:

A still further disturbance of video signals unauthorizedly recorded on tape can be obtained in the manner of FIG. 3. In Part A of FIG. 3 a normal line portion 3 of the signal of Part A of FIG. 1 is reproduced. This comprises a line synchronization pulse 2, a colour synchronization signal 8, and image signals 9, which, here, represent a grey wedge or the like.

According to the invention, as shown in Part B of FIG. 3, after the colour synchronization signal 8 an additional pulse 6' is added, of which the length and location can vary. When recording such a signal with a tape recording apparatus, this additional pulse causes again the amplification control 1 to be affected, so that a portion of the subsequent image point signals 9 will be attenuated, which provides an additional deterioration of the image quality. Also this disturbance can be provided in arbitrary lines and/or frames.

An amplification of the effect can be obtained in the manner of Part C of FIG. 3, in which the additional pulse 6' at its end is continued by an oppositely directed pulse 6".

Those above-mentioned disturbation manners can be used independently from one another, but provide, together, an optimal safety against unauthorizedly recording video signals on tape. The additional signals have no influence on the control circuits of an image reproducing apparatus having a synchronization which is simpler than that of the recording head of a tape recording apparatus. Circuits for executing the method according to the invention can be executed in different ways, and comprise mixing stages in which the additional pulses, which are generated synchronously with the pulses 2 of the video signal, are mixed in the envisaged points with the video signal according to a program, and in particular a variable program, or according to a random function.

I claim:

1. A method for processing video signals so as to inhibit making of acceptable videotape recordings therefrom, said method comprising receiving video signals comprising image point signals grouped according to image lines and preceded, in each line, by a normal line synchronization pulse and a color synchronization signal, and a plurality of said lines being combined to form a frame preceded by a frame synchronization pulse, said video signals comprising a plurality of said frames and the image point signals and the synchronization pulses having opposite senses with respect to a zero level, and the method further comprising removing, at pseudorandom locations, in a portion of the frames, in a number of last lines thereof, the normal line synchronization pulses, and introducing, in place thereof, additional pulses of a shape different from that of the normal synchronization pulses so as to inhibit making of acceptable recordings from said video signals.

2. The method of claim 1, wherein characterized in that the points of introduction of said additional pulses differ in different frames.

3. The method of claim 2, wherein, in at least part of the lines of a frame and between the color synchronization signal and the image point signals, a further additional pulse having the same polarity with respect to the zero level as the line synchronization pulses is added.

4. The method of claim 5, wherein the location of the further additional pulse is varied in different frames.

5. The method of claim 4, wherein the duration of the further additional pulse is varied in different frames.

6. The method of claim 3, further comprising adding another additional pulse adjacent to said additional pulse, said another additional pulse being of the opposite polarity to said additional pulse with respect to said zero level.

7. The method of claim 3 wherein the location of the further additional pulse is varied in different frames.

8. The method of claim 1 wherein the additional pulses are shorter in duration than said normal line synchronization pulses.

9. The method of claim 1 wherein said additional pulses are of a smaller amplitude than said normal synchronization pulses.

10. A method for processing video signals so as to inhibit the making of acceptable videotape recordings therefrom, said method comprising receiving video signals comprising image point signals grouped according to image lines and preceded, in each line, by a normal line synchronization pulse and a color synchronization signal, and a plurality of said lines being combined to form a frame preceded by a frame synchronization pulse, said video signals comprising a plurality of said frames and the image point signals and the synchronization pulses having opposite polarities with respect to a zero level and the method further comprising adding, in at least a part of the lines of a frame and between the color synchronization signal and the image point signals, an additional pulse having the same polarity with respect to the zero level as the line synchronization pulses so as to inhibit making of acceptable recordings from said video signals.

11. The method of claim 10 wherein the location of the additional pulse is varied in different frames.

12. The method of claim 11 wherein the duration of the additional pulse is varied in different frames.

13. The method of claim 10, wherein the duration of the additional pulse is varied in different frames.

14. The method of claim 10, further comprising adding a further additional pulse adjacent to said additional pulse, said further additional pulse being of the opposite polarity to said additional pulse with respect to said zero level.

15. The method of claim 10, further comprising removing at pseudorandom locations, at least in a portion of the frames, in a number of last lines thereof, the normal line synchronization pulses, and introducing, in place of said normal line synchronization pulses, substitute pulses of a shape different from that of the normal line synchronization pulses.

16. The method of claim 15 wherein said substitute pulses are added at different locations in different frames.

17. The method of claim 15 wherein the substitute pulses are shorter in duration than said normal line synchronization pulses.

* * * * *